United States Patent [19]

Lough

[11] Patent Number: 4,666,477
[45] Date of Patent: May 19, 1987

[54] ADJUSTABLE DAMPER FOR CLEAN ROOM SYSTEMS

[75] Inventor: Wendell J. Lough, Hampstead, N.H.

[73] Assignee: Weber Technical Products, Division of Craig Systems Corporation, Amesbury, Mass.

[21] Appl. No.: 854,991

[22] Filed: Apr. 22, 1986

[51] Int. Cl.⁴ ............................................. B01D 46/42
[52] U.S. Cl. ........................................ 55/276; 55/418; 55/385 A; 55/DIG. 29; 98/40.11; 98/41.3; 55/DIG. 10; 137/625.3; 251/251; 251/368
[58] Field of Search ................... 55/276, 418, 385 A, 55/DIG. 29; 98/41.3, 40.11, DIG. 10; 251/251, 368; 137/625.33, 625.3

[56] References Cited

U.S. PATENT DOCUMENTS

| | | |
|---|---|---|
| 14,798 | 5/1856 | Bruff . |
| 299,960 | 6/1884 | Chadwick . |
| 911,457 | 2/1909 | Stewart . |
| 2,251,663 | 8/1941 | Darbo .............................. 55/418 X |
| 2,525,371 | 10/1950 | Reynolds, Sr. . |
| 2,587,633 | 3/1952 | Levin . |
| 2,708,869 | 5/1955 | Grossenbacher et al. . |
| 2,792,771 | 5/1957 | Burwen . |
| 3,001,464 | 9/1961 | Moore .............................. 55/418 X |
| 3,073,525 | 1/1963 | Cislo . |
| 3,156,233 | 11/1964 | O'Connell ........................ 55/276 X |
| 3,429,250 | 2/1969 | Kodaras ............................ 98/40.11 |
| 3,429,335 | 2/1969 | Grassel et al. ............... 137/625.3 X |
| 3,522,724 | 8/1970 | Knab . |
| 3,680,468 | 8/1972 | Schueler ............................ 98/41.3 |
| 3,780,503 | 12/1973 | Smith .................................... 55/418 |
| 3,921,449 | 11/1975 | Hauffe et al. . |
| 3,986,850 | 10/1976 | Wilcox ........................... 55/385 A X |
| 4,030,518 | 6/1977 | Wilcox ............................. 251/251 X |
| 4,207,870 | 6/1980 | Eldridge . |
| 4,256,143 | 3/1981 | Magill et al. . |
| 4,302,262 | 11/1981 | Kay . |
| 4,303,223 | 12/1981 | Whisenhunt et al. ........... 251/368 X |
| 4,377,274 | 3/1983 | Mayhew, Jr. .................... 251/368 X |
| 4,399,739 | 8/1983 | Dean .......................... 98/DIG. 10 X |
| 4,407,187 | 10/1983 | Horney . |
| 4,549,472 | 10/1985 | Endo et al. .................... 55/385 A X |

FOREIGN PATENT DOCUMENTS 2832774  2/1980  Fed. Rep. of Germany ....... 98/41.3
1210654 10/1970  United Kingdom ................. 98/41.3

OTHER PUBLICATIONS

The Condensed Chemical Dictionary, 8th ed., New York, Van Nostrand Reinhold Co., 1971, p. 706.

Primary Examiner—Kathleen J. Prunner
Attorney, Agent, or Firm—Price, Heneveld, Cooper, DeWitt & Litton

[57] ABSTRACT

An adjustable damper or air flow control valve for clean room systems, laminar flow benches, filter diffusers, fan/filter units and the like includes a fixed plate defining a plurality of rows of apertures. The plate is fabricated from an aluminum-clad fiberboard. A movable, foam plate is positioned on the fixed plate. The foam plate is fabricated from a cross linked polyethylene foam and also defines a plurality of apertures. The foam conforms to the fiberboard plate and prevents cross flow between adjacent apertures. Relative movement between the two plates moves the apertures into and out of alignment to control the flow of air to a filter.

11 Claims, 5 Drawing Figures

ADJUSTABLE DAMPER FOR CLEAN ROOM SYSTEMS

BACKGROUND OF THE INVENTION

The present invention relates to air filtration systems and more particularly to control valves or dampers for adjusting the flow of air through filters of a clean room.

Clean rooms provide a controlled, contaminate free work area necessary for many manufacturing, medical and research operations. Typical clean rooms include a plenum above a bank of high efficiency filters or a plurality of diffuser units supported in a ceiling structure. A blower introduces air under pressure to the plenum above the filters or to the individual diffuser units. The air is forced through the filters and passes vertically downwardly into the room. Return ducts are provided in or adjacent a floor to recirculate the air to the blower.

A clean room has a higher pressure than the pressure around the room or adjacent the room's exterior. This pressure gradient forces contaminants out of the room. Air flow is regulated in part by dampers or air flow control valves positioned adjacent the filters or in the diffuser units. Accurate control of the air flow is necessary to maintain the desired flow rates and pressure gradients.

With most clean room systems, a large volume of air is transferred and relatively high air flow rates are experienced. Heretofore, pivoting or sliding vanes or louvers have been provided to block air passage through the filters. With such valves, metal-to-metal contact permits leakage and inefficiency. This leakage may also cause undesirable whistling and vibration.

Examples of clean room systems and prior filter systems may be found in U.S. Pat. Nos. 3,522,724 entitled METHOD AND APPARATUS FOR TESTING CLEAN ROOM FILTRATION EFFICIENCY and issued on Aug. 4, 1970, to Knab; 3,780,503 entitled LOW PROFILE FILTER SYSTEM and issued on Dec. 25, 1973, to Smith; and 3,986,850 entitled FLOW CONTROL APPARATUS AND AIR FILTERS and issued on Oct. 19, 1976, to Wilcox. The Smith and Wilcox patents both disclose filter systems having sliding plate valves. In the Smith system, a fixed plate defining a plurality of apertures is secured to a filter frame above a high efficiency filter. A movable plate also defining a plurality of apertures is slidably positioned on the fixed plate. A cam arrangement, accessible from the downstream side of the filter, adjusts the relative positioning of the two plates. The apertures are moved into and out of alignment to adjust the air flow.

In the Wilcox sliding plate valve, a highly viscous, nonevaporating fluid is positioned between the two plates to prevent cross flow or lateral flow of air between the plates. The fluid may be a household petrolatum or a silicone grease. The nonevaporating fluid must be evenly applied between the plates for proper operation.

A need exists for an air flow control valve or damper adapted for use in clean room systems which permits accurate adjustment of flow without cross flow or leakage and which is more easily manufactured at reduced costs when compared to prior approaches. A need further exists for a damper which will reduce or attenuate the noise associated with the high flow and volume rates found in the typical clean room.

SUMMARY OF THE INVENTION

In accordance with the present invention, the aforementioned needs are substantially fulfilled. Essentially, the present invention includes a fixed plate secured to a HEPA or high efficiency filter frame and a sliding plate formed from a cross linked polyethylene foam. The fixed plate and sliding plate each define a plurality of regularly spaced apertures. Relative movement of the plates shifts the apertures into and out of alignment to control air flow. The fixed plate is a relatively inexpensive aluminum-clad fiberboard. The fiberboard has a strength and stiffness similar to that of a standard shoe box. The board is covered with an aluminum foil material. The cross linked polyethylene foam plate conforms to the contours of the fixed plate and provides a seal between the apertures to prevent cross leakage.

The air filtration system in accordance with the present invention substantially reduces the steps and costs involved with the manufacturing process when compared to prior approaches. Labor intensive manufacturing steps are eliminated. The apertures may be accurately formed in both plates by positioning one on top of the other and stamping out the apertures simultaneously. The foam material allows the flow damper to be easily slid, resulting in ease of valve operation. The air flow control valve in accordance with the present invention provides substantial sound attenuation.

DETAILED DESCRIPTION OF THE PREFERRED EMBODIMENT

Figure 1:
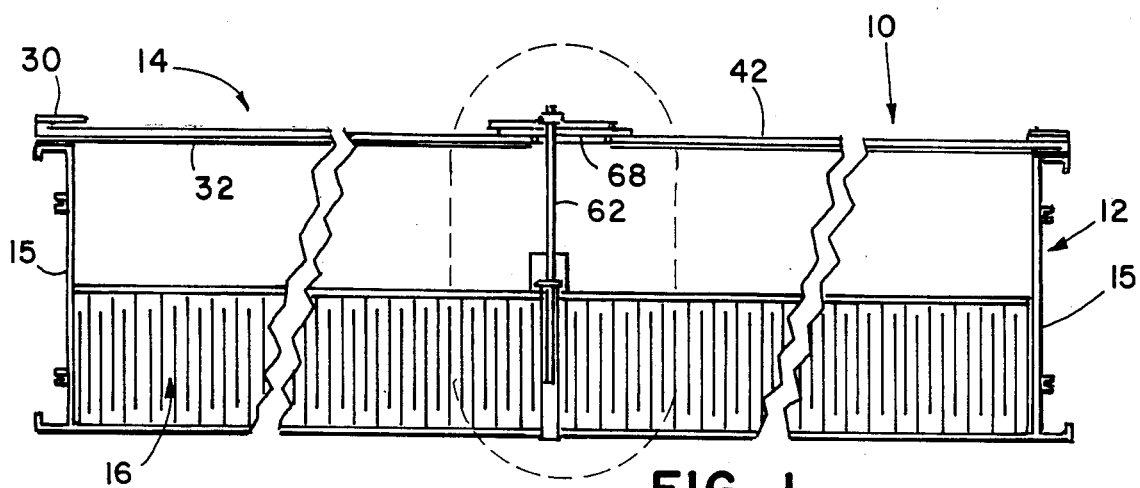
FIG. 1 is a cross-sectional, side elevational view of the filter assembly in accordance with the present invention.

A preferred embodiment of an air filtration system or filter unit in accordance with the present invention is illustrated in FIG. 1 and generally designated 10. Unit 10 includes a high efficiency or HEPA filter 12 and an air flow control valve or damper 14. Filter 12 includes a frame having sidewalls 15 and a standard HEPA filter media 16 designed for use in clean room facilities. The basic unit 10 is similar to that disclosed in the aforementioned U.S. Pat. No. 3,780,503. Frame 15 is supported on a conventional overhead grid (not shown). The grid supports the air supply system, as well as lighting fixtures and the like.

Figure 3:
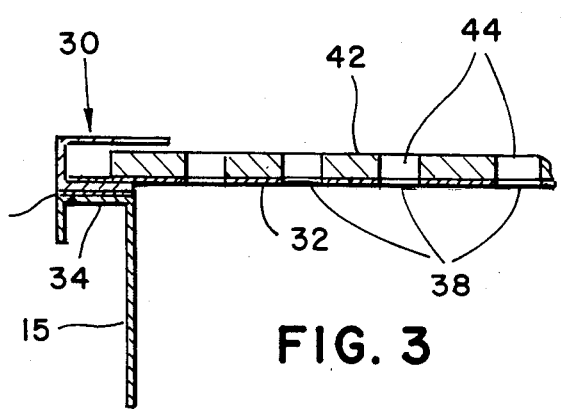
FIG. 3 is an enlarged, fragmentary, cross-sectional view showing the filter frame and a portion of the air flow control valve.

As best seen in FIGS. 1 and 3, air flow control valve 14 includes a damper frame or extrusion 30 which extends around the periphery of filter frame 15. A fixed plate 32 extends into the channel defined by extrusion 30 on a top flange 34 of frame 15. Extrusion 30 is secured to flange 34 by double-sided tape 36. Plate 32 defines a plurality of regularly spaced rows of apertures 38. The apertures extend through the top and bottom surfaces of plate 32. In the preferred form, plate 32 is an aluminum clad fiberboard. The fiberboard has the strength and stiffness similar to that of a standard shoe box. The fiberboard is covered with an aluminum foil material. The plate is less expensive to fabricate than the metal or ABS plastic plates used in prior control valves.

Resting on the upper surface of plate 32 is a generally rectangular foam sheet or plate 42. Plate 42 defines a plurality of regularly spaced rows of apertures 44. Plate 42 is preferably formed from cross linked polyethylene foam. As seen in FIG. 3, the plates are positionable so that apertures 44 and 38 are in alignment. Shifting of plate 42 relative to plate 32 moves the apertures out of alignment and hence limits the flow of air through damper 14. In the preferred form, plate 42 is a relatively thick piece of foam material having a thickness of at least one-fourth of an inch. The foam material is sufficiently flexible so as to effect a seal between adjacent apertures. This eliminates cross flow and insures that the air flows only through apertures 44, 38 and does not flow laterally between the two plates. The foam will conform to irregularities or the contours of the fixed plate.

The cross linked polyethylene employed in the present invention has high temperature resistance and excellent resistance to chemicals and creep. The material is insoluble in organic solvents and does not stress crack. The material is also nontoxic. These properties provide advantages in the clean room environment.

Figure 2:
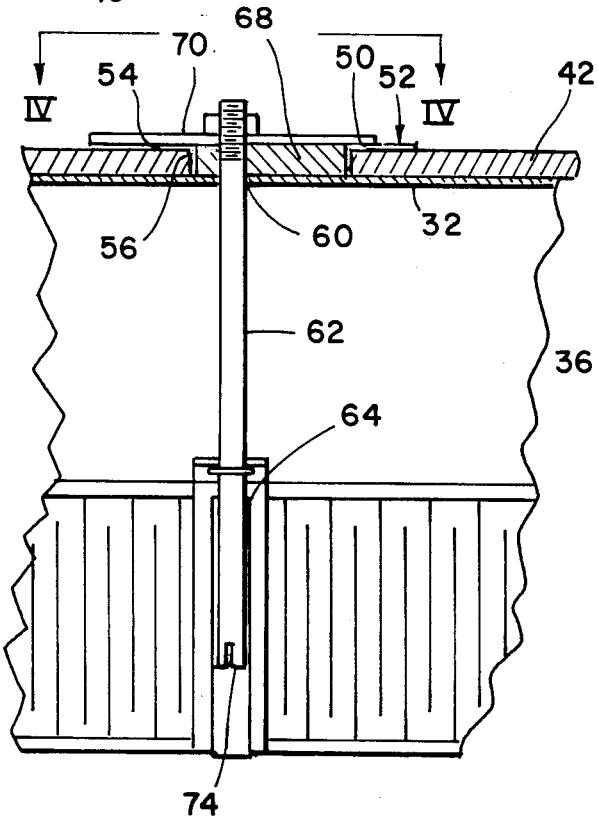
FIG. 2 is an enlarged, fragmentary, cross-sectional view of the assembly of FIG. 1.
Figure 4:
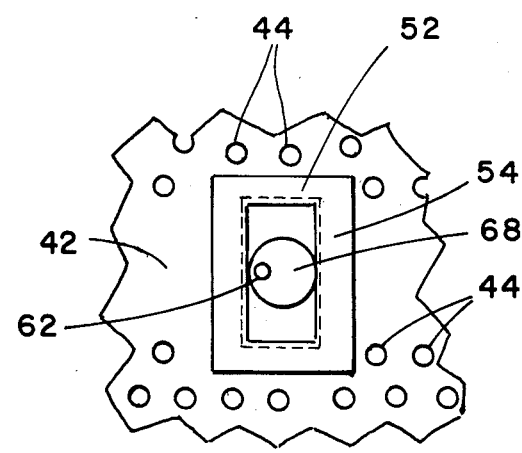
FIG. 4 is a fragmentary, plan view taken generally along line IV—IV of FIG. 2.

As shown in FIGS. 2 and 4, provision is made for adjusting the plates relative to each other. Plate 42 defines an eccentric guide aperture 50 in a central area of the plate. Positioned within aperture 50 is an eccentric guide 52. Guide 52 includes a top flange 54 and sidewalls 56 defining a cam surface. Fixed plate 32 defines a damper adjustment rod aperture 60. An adjustment rod 62 extends through a central aperture 64 in filter 16. Rod 62 extends through aperture 60 and through aperture 50. Secured to rod 62 is an eccentric or cam 68. The adjustment means is covered by an eccentric cap or closure plate 70, illustrated in FIG. 2. Cap 70 is not shown in FIG. 4. Rod 62 includes a slotted end 74. A tool inserted into slotted end 74 rotates rod 62. Rotation of rod 62, as should be apparent from FIG. 4, positions the eccentric against the inner surface defined by sidewalls 56. The camming action shifts plate 42 relative to plate 32 to move the apertures 44, 38 into and out of alignment with each other.

The damper or air flow control valve 14 in accordance with the present invention is readily adapted to the multi-unit plenum systems heretofore employed in clean rooms. The air flow control valve may also be incorporated in a diffuser unit of the type illustrated in the aforementioned Knab patent. The damper provides a variable air flow device usable in large area systems. The damper acts as an equalizer or balancer and permits accurate adjustment to maintain the desired flow pattern and pressure gradients in a clean room facility. The control valve of the subject invention, due to its unique advantages, may be incorporated into other systems where air velocity equalization and sound attenuation are desirable. These include, for example, multiple filter module or fan/filter units, laminar flow benches, single filter units and wall registers. The use of the damper is not limited to the clean room environment.

With the present invention, relatively labor intensive manufacturing operations are eliminated. The control valve is relatively easily and inexpensively manufactured using less costly materials. The apertures 38 and 44 may be accurately formed in the plates in a single operation. The foam insures ease of operation and eliminates cross flow between the plates.

Figure 5:
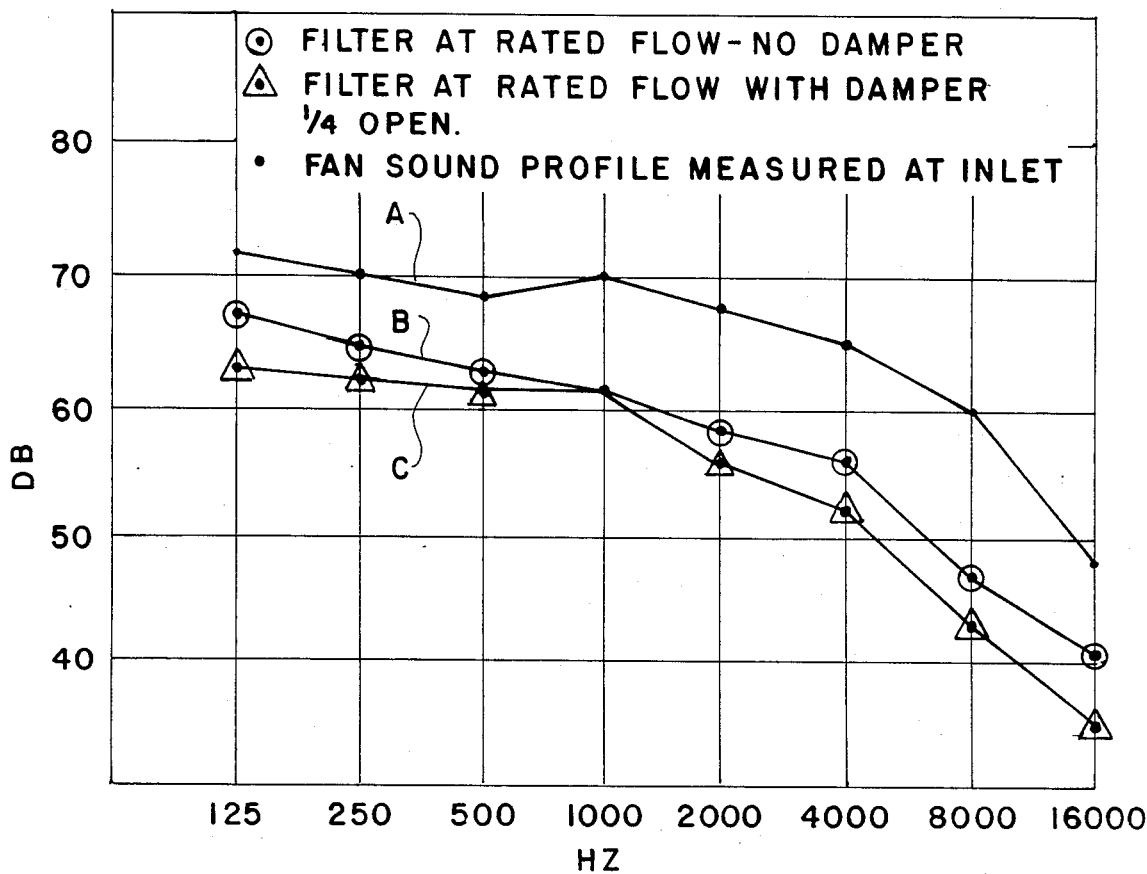
FIG. 5 is a graph illustrating the sound attenuation characteristics of a filter unit in accordance with the present invention.

The air flow control valve in accordance with the present invention has highly desirable sound attenuation characteristics when compared to prior damper structures. The foam and aluminum-clad fiberboard eliminates vibration problems and resulting noise. FIG. 5 illustrates the sound attenuation characteristics of a filter unit of the type illustrated in FIG. 1. Noise levels in decibels are shown as a function of frequency in hertz. Line A is a graph of the fan sound profile measured at the inlet to the filter unit. Line B is a graph of the sound profile at the outlet or downstream side of the filter at rated flow without the air flow control valve present. Line C is a graph of the sound profile at the filter outlet at rated flow with a damper in accordance with the present invention at a one-quarter open position. As shown, a significant reduction in sound levels across the frequency spectrum is obtained. These desirable sound attenuation characteristics result from the unique combination of the cross linked polyethylene foam plate and aluminum-clad fiberboard fixed plate.

In view of the foregoing description, those of ordinary skill in the art may envision various modifications which would not depart from the inventive concepts disclosed herein. For example, an adjustment mechanism other than the eccentric shown could be used. Therefore, the above description should be considered only as that of the preferred embodiment. The true spirit and scope of the present invention may be determined by reference to the appended claims.

The embodiments of the invention in which an exclusive property or privilege is claimed are defined as follows:

1. An air filtration system comprising:
    a frame;
    an air filter supported by said frame;
    an air flow control valve on said frame in spaced relationship with said air filter, said valve comprising:
    a fixed plate defining a plurality of rows of apertures, said fixed plate being mounted on said frame and being fabricated from fiberboard;
    a foam plate movably positioned on said fixed plate, said foam plate defining a plurality of apertures; and
    adjustment means connected to said foam plate for moving said foam plate relative to said fixed plate to move said apertures into and out of alignment, said foam plate fabricated from a material of sufficient flexibility to conform to and seal with an upper surface of said fixed plate to prevent leakage between said apertures and to provide for sound attenuation.

2. An air filtration system as defined by claim 1 wherein said fixed plate is an aluminum-clad fiberboard plate.

3. An air filtration system as defined by claim 2 wherein said apertures in said fixed plate and said foam plate are of the same dimensions.

4. An air filtration system as defined by claim 3 wherein said foam plate is cross linked polyethylene foam.

5. An air filtration system as defined by claim 4 wherein said adjustment means comprises:
    an eccentric guide carried by said foam plate;
    a damper rod extending into said guide; and an eccentric secured to said rod and engaging said guide.

6. An air filtration system as defined by claim 1 wherein said foam plate is cross linked polyethylene foam.

7. An air flow control valve capable of providing air velocity equalization and sound attenuation, said valve comprising:
- an elongated, generally rectangular aluminum clad, fiberboard sheet, said sheet defining a plurality of regularly positioned first apertures;
- an elongated, generally rectangular cross linked polyethylene foam sheet in sealing and sliding contact with said fiberboard sheet, said foam sheet defining a plurality of regularly positioned second apertures; and
- adjustment means engaging one of said sheets for moving said sheets relative to each other between an open position with said apertures in alignment and a closed position with said apertures out of alignment, said foam sheet preventing cross flow between said apertures and providing sound attenuation downstream of said fiberboard sheet.

8. An air flow control valve as defined by claim 7 wherein said fiberboard sheet defines an adjustment aperture and said foam sheet defines an eccentric aperture.

9. An air flow control valve as defined by claim 8 wherein said adjustment means comprises:
- an elongated adjustment rod extending through said adjustment aperture and said eccentric aperture;
- an eccentric guide disposed within said eccentric aperture and defining a surface; and
- a cam mounted on said rod and contacting said surface so that rotation of said rod shifts said foam sheet relative to said paperboard sheet.

10. An air flow control valve as defined by claim 9 wherein said foam sheet has a thickness of at least one-fourth inch.

11. An air flow control valve as defined by claim 10 wherein said fiberboard is clad with aluminum foil.

* * * * *